S. F. LEFLER.
Churn.
No. 19,034.
Patented Jan. 5, 1858.
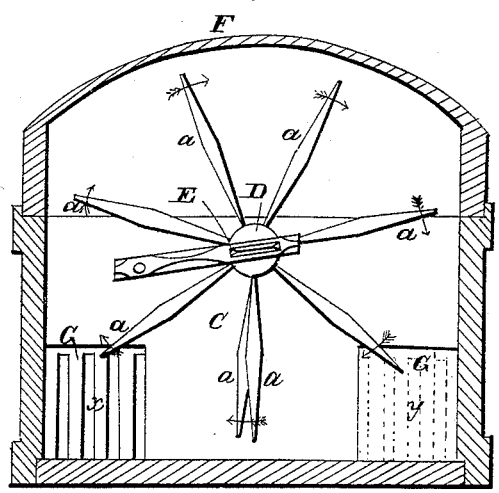
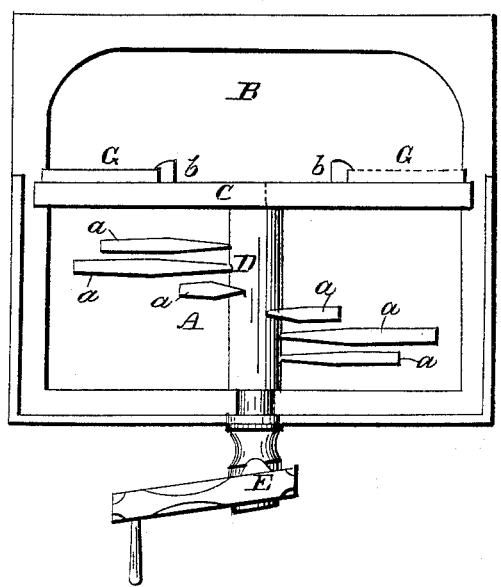

UNITED STATES PATENT OFFICE.

SILAS F. LEFLER, OF RACINE, WISCONSIN.

CHURN.

Specification of Letters Patent No. 19,034, dated January 5, 1858.

*To all whom it may concern:*

Be it known that I, SILAS F. LEFLER, of the city and county of Racine and State of Wisconsin, have invented a certain new and useful Improvement in Churns, of which the following is a full, clear, and exact description, reference being had to the accompanying drawing, making part of this specification, in which—

Figure 1, represents a side elevation of a churn constructed on my improved plan, the front side being removed to show the interior arrangement. Fig. 2 represents a plan of the same, the cover or cap piece being removed.

In churning it would be very desirable to be able to agitate the cream in an open compartment, so as to give free access to the fresh air, were it not for the scattering of the cream as it is agitated; for this reason the operation of churning is effected in a close compartment. But as it is a generally well-known fact that the access of fresh air to the cream greatly promotes the prompt formation of butter, many contrivances have been invented to force it into the churning compartment. As ingenious as many of these contrivances may be, they are generally of a too complicated nature, which not only renders such churns costly, but great difficulty is experienced in cleaning them thoroughly after each churning, so as to remove every particle of residue, which would otherwise occasion the formation of new chemical compounds, greatly injurious to the taste and quality of the butter; thus more than counterbalancing the advantages derived from the speedy churning of the butter, by the loss of time and labor experienced in cleansing the churn afterward.

To obviate these several disadvantages is the object of my present improvement and it consists in a new mode of constructing and operating a churn, whereby the whole of the cream in churning is exposed successively and continually to the free action of the open air while the agitation of the cream is effected in a close compartment; a churn made on this plan can by its simplicity be made generally available, at little cost, and with a great saving of time and labor in cleaning it after the operation of churning has been effected.

My improvement further consists in so constructing and operating the churn that all the butter formed will accumulate of itself in a mass, by means of which it can be much more readily removed than by the usual plan of gathering it.

To enable others skilled in the art to make, construct and use my invention, I will now proceed to describe its parts in detail.

In the accompanying drawing the churn is represented as being divided vertically into two unequal sized compartments (A and B) by a partition (C) for the reception of which suitable grooves are formed in the sides of the churn. On the upper side of the larger one (A) and partition (C) are formed bearings for the reception of a shaft (D) provided with a series of paddles (a, a, a) arranged spirally around it. To the outer end of this shaft is secured a crank shaft (E) by means of which the shaft and paddles are revolved. Over the compartment (A) is fitted a cover (F) constructed in a manner similar to the housing of a paddle wheel to prevent the spattering of the cream as it is agitated by the revolution of the paddles (a, a). At both ends on the underside of the partition (C) are formed openings or gate ways (x, y) through which communication is established between the two compartments; on the sides of these openings are formed guideways (b) for the purpose of holding in place a sliding gate (G), the lower end of which is formed with a series of slots, or if deemed preferable with holes, so as to give free passage to the cream through them from one compartment to the other.

When it is desired to churn, the cream is poured into the churn through the open compartment (B) and the gate arranged in front of the gateway (x) next the side on which the paddles are raising when revolved, as indicated by arrows in Fig. 1. The shaft with the paddles being then revolved, the cream in the close compartment (A) will be forced through the gate (G), thus breaking its direct motion and causing it to force its way into the open compartment (B) in a highly agitated state most propitious for the formation of butter. As fast as the cream is forced through the gate (G) into the open compartment (B) it will return to the close compartment (A) through the other gateway (y) arranged at the other end of the partition board, thus establishing a continuous current. The cream as it passes through the open compartment is exposed to the action of the fresh air, and being strongly agitated it (the cream) carries with it a quantity of air into the close compartment, which commingles with it and greatly assists in the prompt formation of the butter. When the operative thinks that all the buttery particles have been separated from the lacteous ones, he removes the gate (G) to the other gateway (y) as indicated by red lines and continues to revolve the shaft until all the butter has accumulated in the open compartment, before the gate (G) which prevents its further progress, whence it can be most readily removed. Or he may merely reverse the motion of the paddles. After the butter has been removed, and the buttermilk poured out, the cover (F) may be lifted up and the shaft (D) and partition (C) removed for the purpose of cleansing the churn, which done, the several parts will be replaced ready for a fresh churning. It will be apparent that the cleansing of a churn so simply constructed can be accomplished with the greatest possible facility, as well as the removing and replacing of its several parts.

Having thus fully described my invention what I claim as new and desire to secure by Letters Patent is—

A churn constructed in two compartments (A and B) the one open and the other closed, when provided with gateways (x and y) and gate (G) or their equivalents, the whole being arranged in the manner substantially as set forth, whereby the cream, during the operation of churning, is passed in a continuous current through them and the butter gathered together for the purposes described.

In testimony whereof I hereunto set my hand.

S. F. LEFLER.

Witnesses:
J. H. HINDS,
JOSEPH CUSHMAN.